Patented Apr. 1, 1952

2,591,645

UNITED STATES PATENT OFFICE 2,591,645

PINACOLONE PEROXIDE

Henry A. Walter, Longmeadow, Mass., assignor to Monsanto Chemical Company, St. Louis, Mo., a corporation of Delaware No Drawing. Application December 6, 1950, Serial No. 199,550

4 Claims. (Cl. 260—338)

This invention relates to a new chemical compound and more particularly to pinacolone peroxide.

One object of this invention is to provide a new chemical compound.

A further object is to provide pinacolone peroxide.

Another object is to provide methods for making pinacolone peroxide.

These and other objects are attained by reacting pinacol or pinacolone with hydrogen peroxide in an acid medium.

The following examples are given in illustration and are not intended as limitations on the scope of this invention. Where parts are mentioned, they are parts by weight.

Example I

One hundred parts of pinacol were added slowly to 235 parts of 70% sulfuric acid at 5° C. After all of the pinacol had been added, the temperature was raised by heating the reaction mixture on a steam bath until all of the pinacol had dissolved. The reaction mixture was then cooled to from 0 to 5° C. and about 110 parts of 27% hydrogen peroxide were added slowly with constant agitation. The reaction mixture was maintained at less than 10° C. for about one hour with constant agitation during which time a crystalline solid precipitated out of the solution. The reaction was continued for an additional half-hour at less than 10° C. and then the aqueous phase was decanted and the crystals recovered by filtration. After purification by multiple washings with water, about 90 parts of crystalline material were obtained which, on analysis, proved to be a peroxide which had a melting point of 124-125° C.

Example II

One hundred parts of pinacolone were dissolved in 280 parts of 70% sulfuric acid at 0° C. and then 127 parts of 27% hydrogen peroxide were added slowly over a period of about 30 minutes while maintaining the temperature at about 0° C. The reaction medium was stirred constantly for about 45 minutes longer at about 0° C. during which time a white precipitate formed. The precipitate was recovered by filtration. The recovered solids were washed with water and acetone and then purified by dissolving them in benzene followed by precipitation with ethanol. The dried precipitate had a melting point of 124-125° C.

The preparation of the peroxide is a relatively simple process. Either pinacol or pinacolone may be used as the starting material. It is dissolved in sulfuric acid preferably of about 70% concentration, or phosphoric acid of about 45% concentration. The solution is then cooled to less than 15° C. and preferably below 10° C. after which, hydrogen peroxide is added slowly with constant agitation. One mol of hydrogen peroxide is required for each mol of pinacol or pinacolone. A slight excess of hydrogen peroxide may be used if desired. For ease of manipulation, a 27% aqueous solution of hydrogen peroxide is preferred. After all of the hydrogen peroxide has been added, the reaction medium is stirred for from 30 minutes to two hours while maintaining the temperature below 15° C. During this time, a crystalline precipitate forms which can be easily recovered by filtration. If desired, the product may be purified by recrystallization from a benzene-ethanol mixture rich in ethanol or by dissolving it in benzene and then precipitating it from the solution with ethanol.

The pinacolone peroxide prepared by the method of either of the examples appears to be a cyclic dimeric peroxide probably having the following formula:

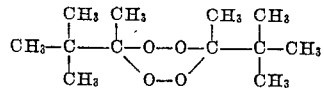

It is exceptionally stable for a peroxide since it does not decompose with explosive force on heating. The peroxide is a valuable polymerization catalyst for ethylenically unsaturated compounds since it is effective at temperatures above 100° C. to cause extremely rapid polymerization without causing discoloration of the polymers formed.

It is obvious that variations may be made in the products and processes of this invention without departing from the spirit and scope thereof as defined in the appended claims.

What is claimed is:

1. Pinacolone peroxide.

2. A process for the preparation of pinacolone peroxide which consists essentially of reacting a member of the group consisting of pinacol and pinacolone with hydrogen peroxide in solution in an acid taken from the group consisting of sulfuric acid and phosphoric acid at temperatures below 15° C.

3. A process for the preparation of pinacolone peroxide which consists essentially of reacting pinacol with hydrogen peroxide in solution in sulfuric acid at temperatures below 15° C.

4. A process for the preparation of pinacolone peroxide which consists essentially of reacting pinacolone with hydrogen peroxide in solution in sulfuric acid at temperatures below 15° C.

HENRY A. WALTER.

No references cited.